United States Patent
Liao et al.

(10) Patent No.: US 8,941,317 B1
(45) Date of Patent: Jan. 27, 2015

(54) POWER DRIVE SYSTEM OF LIGHT-EMITTING DIODE STRINGS

(71) Applicant: Delta Electronics, Inc., Taoyuan County (TW)

(72) Inventors: Te-Chih Liao, Taoyuan County (TW); Shu-Zheng Huang, Taoyuan County (TW); Sheng-Hong Wang, Taoyuan County (TW); Chih-Hao Liu, Taoyuan County (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 14/174,002

(22) Filed: Feb. 6, 2014

(30) Foreign Application Priority Data

Oct. 31, 2013 (TW) ............................. 102139469 A

(51) Int. Cl.
*H05B 41/24* (2006.01)
*H05B 41/16* (2006.01)
*H05B 33/08* (2006.01)

(52) U.S. Cl.
CPC ........ *H05B 33/0812* (2013.01); *H05B 33/0827* (2013.01)
USPC .......................................... 315/274; 315/276

(58) Field of Classification Search
CPC ....................................................... H05B 41/02
USPC ............................... 315/272–276, 291, 200 R
See application file for complete search history.

(56) References Cited

U.S. PATENT DOCUMENTS 8,432,104 B2 * 4/2013 Hu et al. ........................ 315/282
2010/0320937 A1 * 12/2010 Huang et al. .................. 315/297

* cited by examiner

*Primary Examiner* — Minh D A
(74) *Attorney, Agent, or Firm* — Lowe Hauptman & Ham, LLP

(57) ABSTRACT

A power drive system of light-emitting diode (LED) strings includes an isolation transformer, a current-sharing capacitor, two rectifying units, and a current control integrated circuit (IC). The isolation transformer has a primary-side winding and a secondary-side winding with a dotted terminal and a non-dotted terminal. The current-sharing capacitor is connected to the dotted terminal at one terminal thereof. One rectifying units is connected to the other terminal of the current-sharing capacitor, and the other rectifying unit is connected to the non-dotted terminal of the secondary-side winding. Each rectifying unit is connected to one LED string. The current control IC is connected between common points of the rectifying units and corresponding anode terminals of the LED strings and corresponding cathode terminals of the LED strings.

9 Claims, 8 Drawing Sheets

US 8,941,317 B1

POWER DRIVE SYSTEM OF LIGHT-EMITTING DIODE STRINGS

BACKGROUND

1. Technical Field

The present disclosure relates generally to a power drive system of light-emitting diode strings, and more particularly to a power drive system of light-emitting diode strings with a current-sharing function.

2. Description of Related Art

For many years, the light-emitting diodes (LEDs) play an important role in the backlight of portable electronic products. In the lighting application, LEDs are the most crucial components in the solid-state lighting industry. The advantages of LEDs include: energy saving, long life-span, free of maintenance, long life-span, and so on. In addition, a well-matched driving circuit for driving LEDs is very necessary in whether the lighting, the backlight, or the display fields. Especially to deserve to be mentioned, the backlight module is an important apparatus for the flat panel display. The backlight module determines the display quality of the flat panel display because of the reliability and stability of the LEDs.

However, the voltage of driving each LED string is not the same because forward voltage of each LED is not exactly identical so that drive currents flowing through the LED strings are not balanced. Accordingly, illumination of the LED string increased linearly with drive current is not uniform so as to reduce luminous efficiency of LED strings. Hence, in order to increase current balance capability between LED strings to improve the display quality of the flat panel display, various current-sharing circuits for LED strings are to come with the tide of fashion.

Reference is made to FIG. 1 which is a schematic circuit block diagram of a prior art drive system of light-emitting diode (LED) strings. The drive system of LED strings is supplied by an external AC power source Vac, and the external AC power source Vac is converted into a DC voltage Vbus by a rectifier 10A. In the drive system, a plurality of DC-to-DC regulators are provided to correspondingly control drive currents flowing through the LED strings. More specifically, the number of DC-to-DC regulators is identical to that of LED strings, and each LED string is electrically connected to one DC-to-DC regulator. Each DC-to-DC regulator receives the DC voltage Vbus outputted from the rectifier 10A and correspondingly provides the required LED drive voltage to the LED string. That is, the DC-to-DC regulators 21A-24A output LED drive voltages $V_{LED1}$-$V_{LED4}$ to correspondingly drive the LED strings. In addition, each DC-to-DC regulator detects the feedback current from the corresponding LED string and adjusts the LED drive voltage for driving the LED string, thus controlling the drive current flowing through the LED string.

Especially, in order to overcome the problem of different drive currents flowing through the LED strings because of the voltage difference between LED strings, the current-sharing mechanism is usually introduced by the DC-to-DC regulators to implement uniform illumination of the LED strings. Each LED string is required to use a DC-to-DC regulator so as to implement the current-sharing function, however, the circuit costs are significantly increased and the size of the power drive system is unfavorable.

Accordingly, it is desirable to provide a power drive system of LED strings to use only one current control IC to control total current flowing through the LED strings, and passive components, such as capacitors and chokes are used to implement the current-sharing function, thus simplifying circuit designs, significantly reducing circuit costs, and increasing adaptive operation to the power drive system.

SUMMARY

An object of the present disclosure is to provide a power system of light-emitting diode strings to solve the above-mentioned problems. Accordingly, the power drive system of light-emitting diode (LED) strings for driving a plurality of LED strings comprises an isolation transformer, a current-sharing capacitor, two rectifying units, and a current control integrated circuit (IC). The isolation transformer has a primary-side winding and a secondary-side winding. The primary-side winding receives an AC power source, and the secondary-side winding has a dotted terminal and a non-dotted terminal. One terminal of the current-sharing capacitor is connected to the dotted terminal of the secondary-side winding. One rectifying unit is connected to the other terminal of the current-sharing capacitor and the other rectifying unit is connected to the non-dotted terminal of the secondary-side winding. Each rectifying unit is correspondingly connected to a LED string. The current control integrated circuit (IC) is connected between common points of the rectifying units and corresponding anode terminals of the LED strings and corresponding cathode terminals of the LED strings, and configured to simultaneously drive the LED strings and control total current flowing through the LED strings.

An object of the present disclosure is to provide a power system of light-emitting diode strings to solve the above-mentioned problems. Accordingly, the power drive system of light-emitting diode (LED) strings for driving a plurality of LED strings comprises an isolation transformer, two current-sharing capacitors, at least one common choke, at least four rectifying units, and a current control integrated circuit (IC). The isolation transformer has a primary-side winding and at least two secondary-side windings. The primary-side winding receives an AC power source, and each secondary-side winding has a dotted terminal and a non-dotted terminal. Two current-sharing capacitors include a first current-sharing capacitor and a second current-sharing capacitor. One terminal of the first current-sharing capacitor is connected to the dotted terminal of one secondary-side winding, and one terminal of the second current-sharing capacitor is connected to the non-dotted terminal of another secondary-side winding. Each common choke is connected between one dotted terminal and one non-dotted terminal of two secondary-side windings. Two rectifying units are correspondingly connected to the other terminal of the first current-sharing capacitor and the other terminal of the second current-sharing capacitor, and other rectifying units are correspondingly connected to the at least one common choke. Each rectifying unit is correspondingly connected to a LED string. The current control integrated circuit (IC) is connected between common points of the rectifying units and corresponding anode terminals of the LED strings and corresponding cathode terminals of the LED strings, and configured to simultaneously drive the LED strings and control total current flowing through the LED strings.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
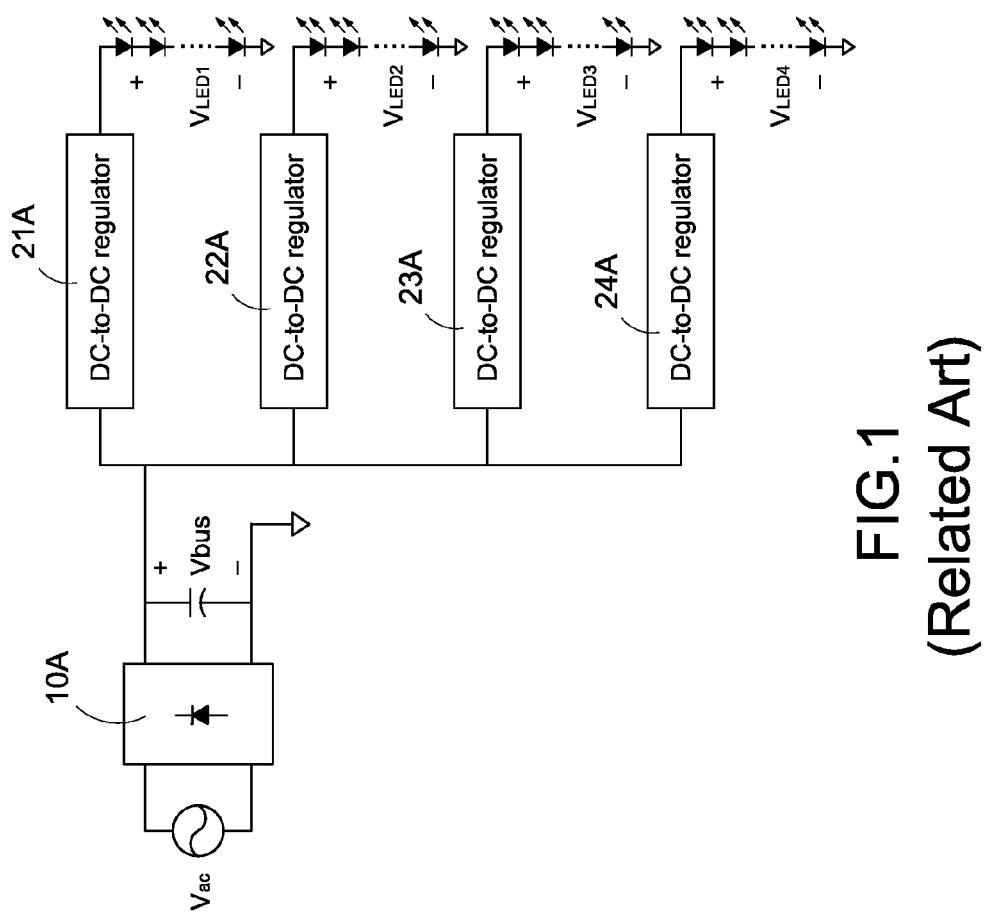
FIG. 1 is a schematic circuit block diagram of a prior art drive system of light-emitting diode strings.

Reference will now be made to the drawing figures to describe the present invention in detail.

Figure 2:
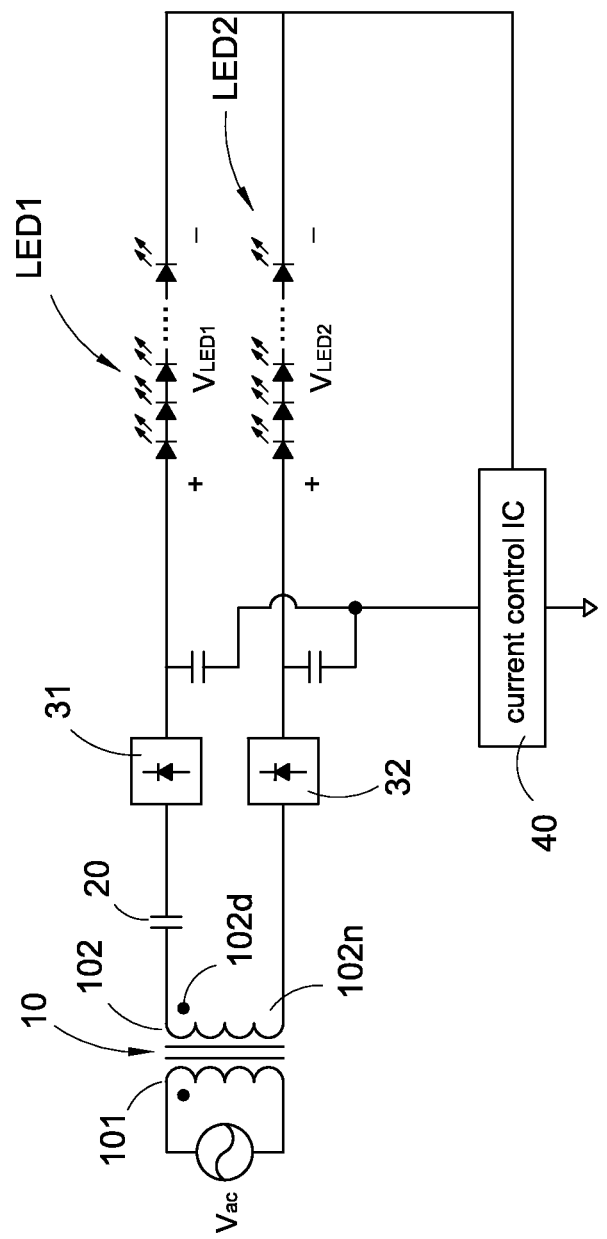
FIG. 2 is a schematic circuit block diagram of a power drive system of light-emitting diode strings according to a first embodiment of the present disclosure.

Reference is made to FIG. 2 which is a schematic circuit block diagram of a power drive system of light-emitting diode (LED) strings according to a first embodiment of the present disclosure. The power drive system of LED strings is provided to drive a plurality of LED strings. For convenience, two LED strings including a first LED string LED1 and a second LED string LED2 are exemplified for further demonstration in this embodiment. In particular, each LED string is composed of a plurality of LEDs connected in series. The power drive system includes an isolation transformer 10, a current-sharing capacitor 20, two rectifying units including a first rectifying unit 31 and a second rectifying unit 32, and a current control integrated circuit (IC) 40. The isolation transformer 10 has a primary-side winding 101 and a secondary-side winding 102. The primary-side winding 101 receives an AC power source Vac, and the secondary-side winding 102 has a dotted terminal 102d and a non-dotted terminal 102n. One terminal of the current-sharing capacitor 20 is connected to the dotted terminal 102d of the secondary-side winding 102. The first rectifying unit 31 is connected to the other terminal of the current-sharing capacitor 20; the second rectifying unit 32 is connected to the non-dotted terminal 102n of the secondary-side winding 102. In addition, the first rectifying unit 31 is connected in series to the first LED string LED 1 and the second rectifying unit 32 is connected in series to the second LED string LED2.

The current control IC 40 is connected between a common point of connecting the first rectifying unit 31 and an anode terminal of the first LED string LED1 and a cathode terminal of the first LED string LED1. Also, the current control IC 40 is connected between a common point of connecting the second rectifying unit 32 and an anode terminal of the second LED string LED2 and a cathode terminal of the second LED string LED2. The current control IC 40 simultaneously drives the first LED string LED 1 and the second LED string LED2 to control total current flowing through the first LED string LED1 and the second LED string LED2. Because the primary-side winding 101 of the isolation transformer 10 receives the AC power source Vac, the AC power source Vac is converted to generate a first LED drive voltage $V_{LED1}$ to drive the first LED string LED1 when the AC power source Vac is operated in a positive half cycle. Also, the AC power source Vac is converted to generate a second LED drive voltage $V_{LED2}$ to drive the second LED string LED2 when the AC power source Vac is operated in a negative half cycle.

Figures 7, 8:
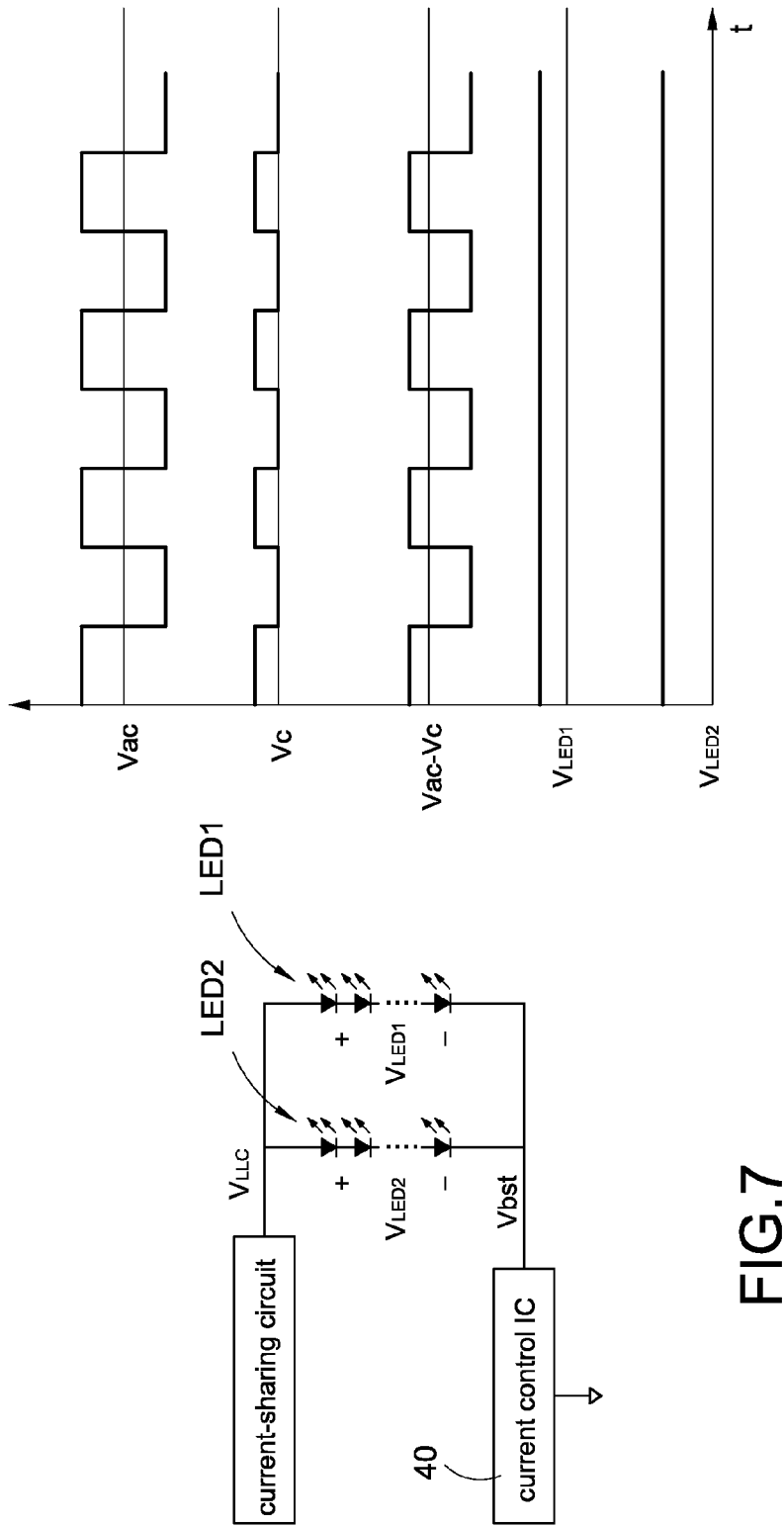
FIG. 7 is a schematic circuit diagram of generating drive voltage of the power drive system according to the present disclosure.
FIG. 8 is a schematic waveform chart of current-sharing control by the current-sharing capacitors of the power drive system according to the present disclosure.

In addition, reference is made to FIG. 7 which is a schematic circuit diagram of generating drive voltage of the power drive system according to the present disclosure. As mentioned above, because forward voltage of each LED is not exactly identical, the voltage of driving each LED string is not the same. The feature of generating the drive voltage is that: a negative terminal of the secondary side of the isolation transformer 10 is connected to a positive terminal of the current control IC 40 so that the LED drive voltage $V_{LED}$ is equal to the sum of a floating conversion voltage $V_{LLC}$ outputted at the current circuit and a boost voltage Vbst outputted at the current control IC 40. That is, $V_{LED}=V_{LLC}+Vbst$. Especially, the fixed conversion voltage $V_{LLC}$ and the adjustable boost voltage Vbst are implemented to overcome the problem of different drive currents flowing through the LED strings because of the voltage difference between LED strings. Accordingly, the current control IC 40 is used to provide adaptive voltage control for implementing uniform illumination of the LED strings, and also to meet wide drive voltage under different current conditions for the LED strings.

In addition, the current-sharing feature of the current-sharing capacitor 20 is introduced according to that the current flowing in the current-sharing capacitor is equal to that flowing out the current-sharing capacitor, thus balancing the voltage difference between two LED strings to balancing the drive current flowing through the LED strings. Reference is made to FIG. 8 which is a schematic waveform chart of current-sharing control by the current-sharing capacitors of the power drive system according to the present disclosure. It is assumed that a voltage difference exists between two LED strings, and the first LED drive voltage $V_{LED1}$ is less than the second LED drive voltage $V_{LED2}$. When the AC power source Vac is operated in a positive half cycle, the current-sharing capacitor is charged to generate a voltage difference Vc. Also, when the first LED drive voltage $V_{LED1}$ is equal to the difference between the input voltage Vac and the voltage difference Vc, namely $V_{LED1}=Vac-Vc$, the currents are balanced. When the AC power source Vac is operated in a negative half cycle, the current-sharing capacitor is discharged. Also, when the second LED drive voltage $V_{LED2}$ is equal to the input voltage Vac, the currents are balanced. Accordingly, the voltage difference between two LED strings is sustained by the current-sharing capacitor so as to implement the current-sharing function.

Figure 9:
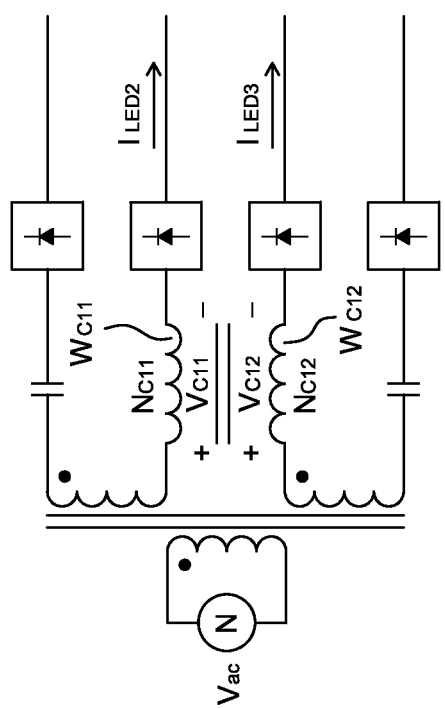
FIG. 9 is a schematic circuit diagram of proportional current control by the common chokes of the power drive system according to the present disclosure.

In addition, reference is made to FIG. 9 which is a schematic circuit diagram of proportional current control by the common chokes of the power drive system according to the present disclosure. The feature of the proportional current control is that: the relationship of current ratio is determined according to the turn ratio of the common choke. It is assumed that the common choke has a first side winding $W_{C11}$ and a second side winding $W_{C12}$, and a turn ratio between the first side winding $W_{C11}$ and the second side winding $W_{C12}$ is $N_{C11}:N_{C12}$. When $N_{C11}:N_{C12}=1:1$, a LED current $I_{LED2}$ flowing through the second LED string LED2 is equal to a LED current $I_{LED3}$ flowing through the third LED string LED3. Similarly, when $N_{C11}:N_{C12}=1:N$, the LED current $I_{LED2}$ flowing through the second LED string LED2 is N times larger than the LED current $I_{LED3}$ flowing through the third LED string LED3. Accordingly, the turn ratio of the common choke can be adjusted to obtain different current ratios between two LED strings.

In addition, the power drive system of LED strings is disclosed to drive a plurality of LED strings, and more particularly to three or more LED strings. The different embodiments of driving different LED strings by the power drive system are described as follows. The power drive system includes an isolation transformer, two current-sharing capacitors including a first current-sharing capacitor 21 and a second current-sharing capacitor 22, at least one common choke, at least four rectifying units, and a current control integrated circuit.

Figure 3:
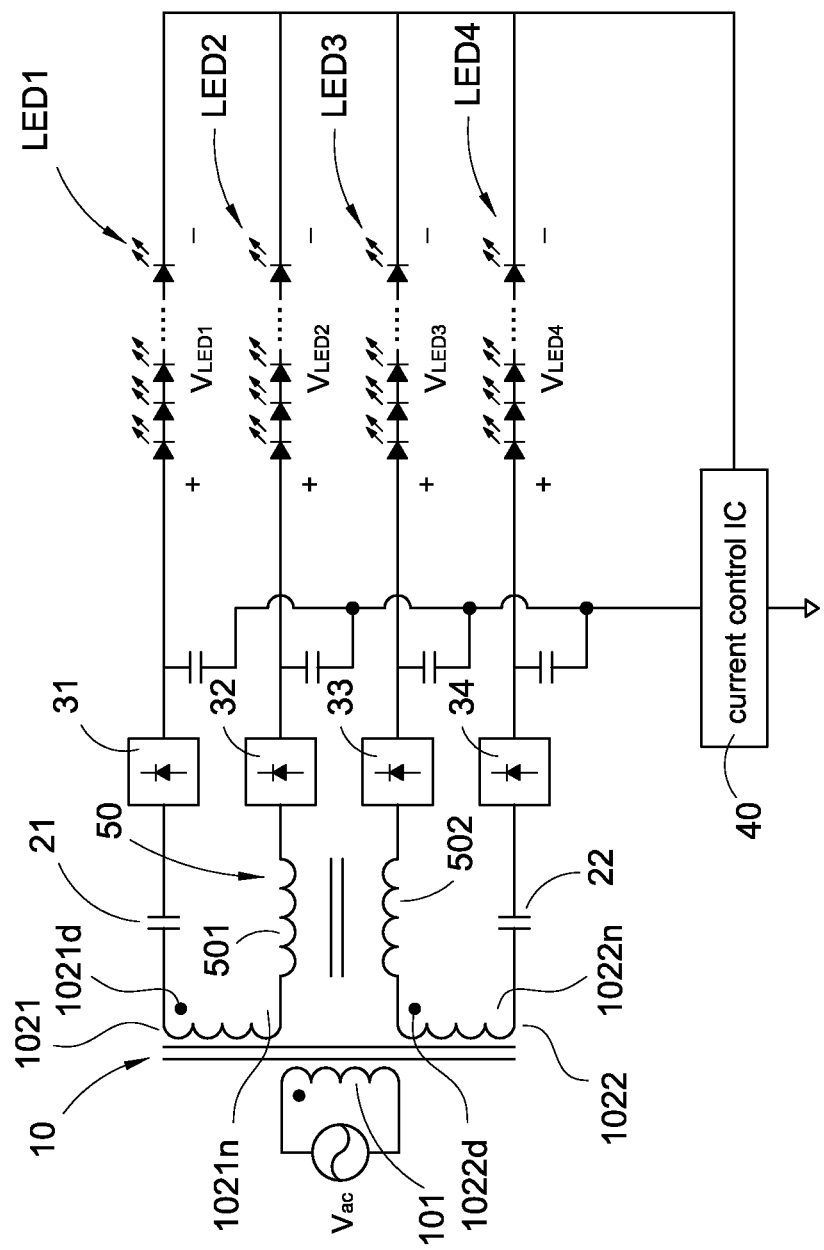
FIG. 3 is a schematic circuit block diagram of the power drive system of light-emitting diode strings according to a second embodiment of the present disclosure.

Reference is made to FIG. 3 which is a schematic circuit block diagram of the power drive system of light-emitting diode strings according to a second embodiment of the present disclosure. In this embodiment, the number of LED strings is four, namely a first LED string LED1, a second LED string LED2, a third LED string LED3, and a fourth LED string LED4. In particular, each LED string is composed of a plurality of LEDs connected in series. In this embodiment, the number of rectifying units is four, namely a first rectifying unit 31, a second rectifying unit 32, a third rectifying unit 33, and a fourth rectifying unit 34. In this embodiment, the isolation transformer 10 has a primary-side winding 101 and two secondary-side windings, namely a first secondary-side winding 1021 and a second secondary-side winding 1022. The primary-side winding 101 receives an AC power source Vac. The first secondary-side winding 1021 has a first dotted terminal 1021d and a first non-dotted terminal 1021n; the second secondary-side winding 1022 has a second dotted terminal 1022d and a second non-dotted terminal 1022n. One terminal of the first current-sharing capacitor 21 is connected to the first dotted terminal 1021d of the first secondary-side winding 1021, and the second current-sharing capacitor 22 is connected to the second non-dotted terminal 1022n of the second secondary-side winding 1022. Especially, the first current-sharing capacitor 21 and the second current-sharing capacitor 22 are correspondingly connected to the two opposite outermost terminals of the secondary-side windings, namely the outermost dotted terminal and the outermost non-dotted terminal. In this embodiment, the first current-sharing capacitor 21 is connected to the first dotted terminal 1021d of the first secondary-side winding 1021; the second current-sharing capacitor 22 is connected to the second non-dotted terminal 1022n of the second secondary-side winding 1022. Also, the first current-sharing capacitor 21 is connected to the first LED string LED1 through the first rectifying unit 31; the second current-sharing capacitor 22 is connected to the fourth LED string LED4 through the fourth rectifying unit 34.

In this embodiment, because the number of secondary-side windings is two, the number of common chokes 50 is one. That is, the number of common chokes 50 is related to the number of secondary-side windings. The common choke 50 has a first side winding 501 with a first terminal and a second terminal and a second side winding 502 with a first terminal and a second terminal. The common choke 50 is connected between the first non-dotted terminal 1021n of the first secondary-side winding 1021 and the second dotted terminal 1022d of the second secondary-side winding 1022. More specifically, the first terminal of the first side winding 501 is connected to the first non-dotted terminal 1021n of the first secondary-side winding 1021, and the first terminal of the second side winding 502 is connected to the second dotted terminal 1022d of the second secondary-side winding 1022. Comparing to the connection between the first current-sharing capacitor 21, the second current-sharing capacitor 22, and the secondary-side windings, the common choke 50 is connected to inner non-dotted terminal of the first secondary-side winding 1021 and inner dotted terminal of the second secondary-side winding 1022.

In this embodiment, the number of rectifying units is four, namely a first rectifying unit 31, a second rectifying unit 32, a third rectifying unit 33, and a fourth rectifying unit 34. The first rectifying unit 31 is connected to the first current-sharing capacitor 21, and the fourth rectifying unit 34 is connected to the second current-sharing capacitor 22. The second rectifying unit 32 is connected to the first side winding 501 of the common choke 50, and the third rectifying unit 33 is connected to the second side winding 502 of the common choke 50. More specifically, the first dotted terminal 1021d of the first secondary-side winding 1021 is connected to the first rectifying unit 31 through the first current-sharing capacitor 21, and the second non-dotted terminal 1022n of the second secondary-side winding 1022 is connected to the fourth rectifying unit 34 through the second current-sharing capacitor 22. Also, the first rectifying unit 31 is connected in series to the first LED string LED1, the second rectifying unit 32 is connected in series to the second LED string LED2, the third rectifying unit 33 is connected in series to the third LED string LED3, and the fourth rectifying unit 34 is connected in series to the fourth LED string LED4.

The current control IC 40 is connected between a common point of connecting the first rectifying unit 31 and an anode terminal of the first LED string LED1 and a cathode terminal of the first LED string LED1. The current control IC 40 is connected between a common point of connecting the second rectifying unit 32 and an anode terminal of the second LED string LED2 and a cathode terminal of the second LED string LED2. The current control IC 40 is connected between a common point of connecting the third rectifying unit 33 and an anode terminal of the third LED string LED3 and a cathode terminal of the third LED string LED3. Also, the current control IC 40 is connected between a common point of connecting the fourth rectifying unit 34 and an anode terminal of the fourth LED string LED4 and a cathode terminal of the fourth LED string LED4. The current control IC 40 simultaneously drives the first LED string LED1, the second LED string LED2, the third LED string LED3, and the fourth LED string LED4 to control total current flowing through the first LED string LED1, the second LED string LED2, the third LED string LED3, and the fourth LED string LED4.

Figure 4:
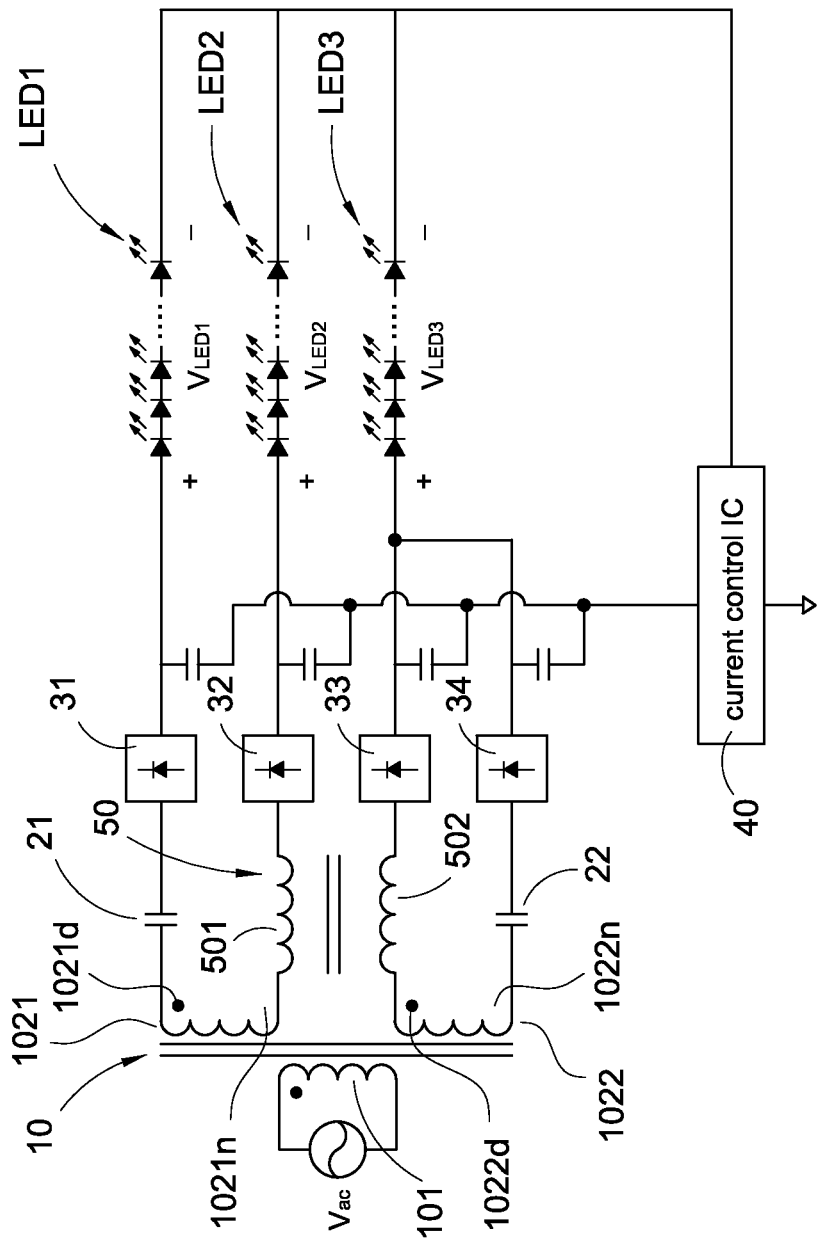
FIG. 4 is a schematic circuit block diagram of the power drive system of light-emitting diode strings according to a third embodiment of the present disclosure.

Reference is made to FIG. 4 which is a schematic circuit block diagram of the power drive system of light-emitting diode strings according to a third embodiment of the present disclosure. The major difference between the third embodiment and the second embodiment is that the number of LED strings is three. Similarly, the first rectifying unit 31 is connected to the first LED string LED1, and the second rectifying unit 32 is connected to the second LED string LED2. The common choke 50 is connected to the first non-dotted terminal 1021n of the first secondary-side winding 1021 and the second dotted terminal 1022d of the second secondary-side winding 1022. Because the number of LED strings is three, the difference to the second embodiment is that the third rectifying unit 33 and the fourth rectifying unit 34 are connected together at output terminals thereof, and then connected to the third LED string LED3. However, the embodiment is only exemplified but is not intended to limit the scope of the disclosure. In other words, the first rectifying unit 31 and the second rectifying unit 32 are connected together at output terminals thereof, and then connected to the first LED string LED1. Correspondingly, the third rectifying unit 33 is connected to the second LED string LED2, and the fourth rectifying unit 34 is connected to the third LED string LED3.

Figure 5:
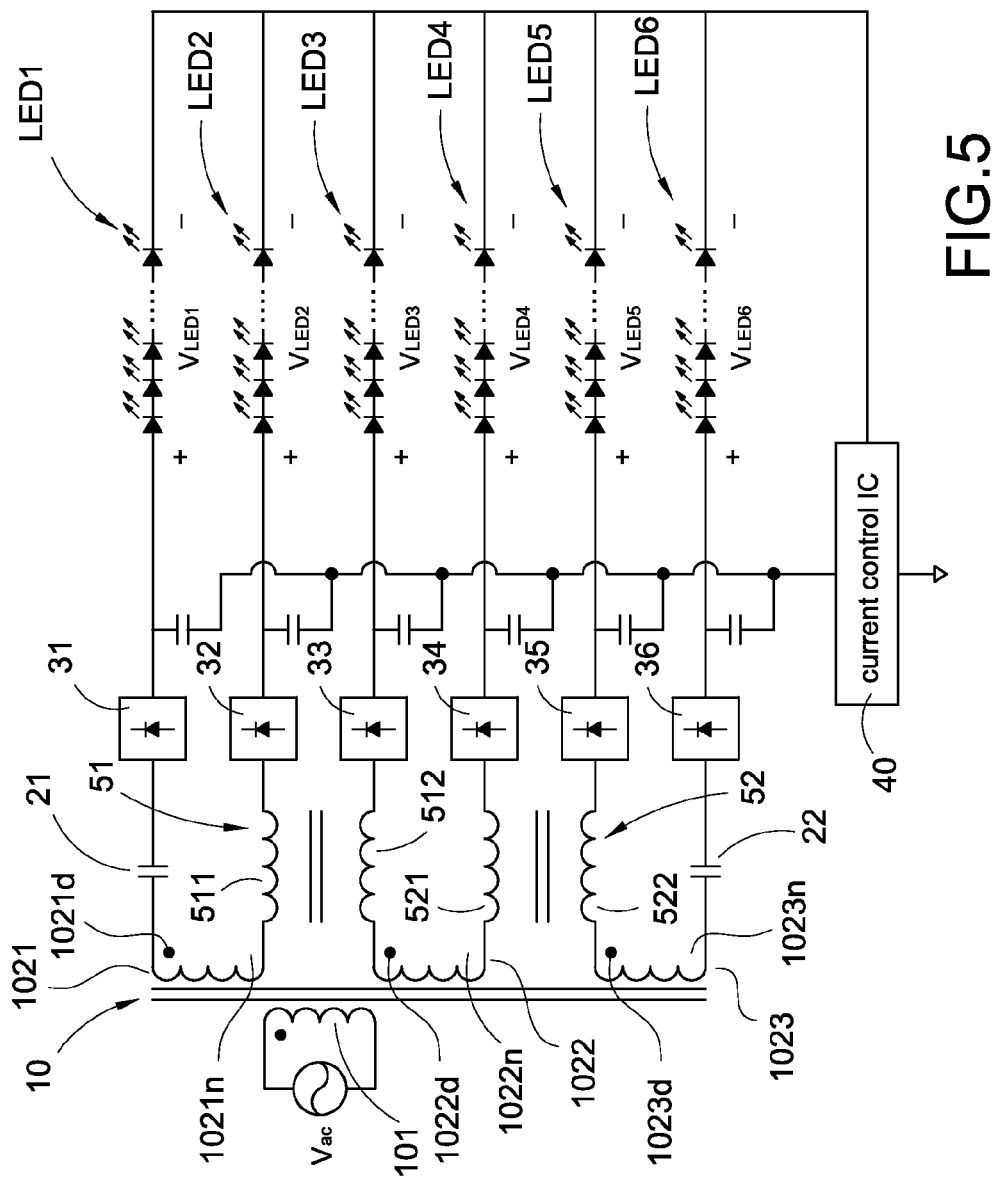
FIG. 5 is a schematic circuit block diagram of the power drive system of light-emitting diode strings according to a fourth embodiment of the present disclosure.

Reference is made to FIG. 5 which is a schematic circuit block diagram of the power drive system of light-emitting diode strings according to a fourth embodiment of the present disclosure. The major difference between the fourth embodiment and the second embodiment is that the number of LED strings is six. Because the number of LED strings is six, the number of secondary-side windings is three, the number of rectifying units is six, the number of current-sharing capacitors is two, and the number of common chokes is two. Each rectifying unit is correspondingly connected to a LED string, and each secondary-side winding is correspondingly connected to two rectifying units and two LED strings. Especially, the first current-sharing capacitor 21 and the second current-sharing capacitor 22 are correspondingly connected to the two opposite outermost terminals of the secondary-side windings, namely the outermost dotted terminal and the outermost non-dotted terminal. In this embodiment, the first current-sharing capacitor 21 is connected to the first dotted terminal 1021*d* of the first secondary-side winding 1021; the second current-sharing capacitor 22 is connected to the third non-dotted terminal 1023*n* of the third secondary-side winding 1023. In addition, a first common choke 51 is connected between the first secondary-side winding 1021 and the second secondary-side winding 1022; a second common choke 52 is connected between the second secondary-side winding 1022 and the third secondary-side winding 1023. More specifically, the first common choke 51 is connected to the first non-dotted terminal 1021*n* of the first secondary-side winding 1021 and the second dotted terminal 1022*d* of the second secondary-side winding 1022; the second common choke 52 is connected to the second non-dotted terminal 1022*n* of the second secondary-side winding 1022 and the third dotted terminal 1023*d* of the third secondary-side winding 1023. Comparing to the connection between the first current-sharing capacitor 21, the second current-sharing capacitor 22, and the secondary-side windings, the first common choke 51 is connected to inner non-dotted terminal of the first secondary-side winding 1021 and inner dotted terminal of the second secondary-side winding 1022, and the second common choke 52 is connected to inner non-dotted terminal of the second secondary-side winding 1022 and inner dotted terminal of the third secondary-side winding 1023.

Figure 6:
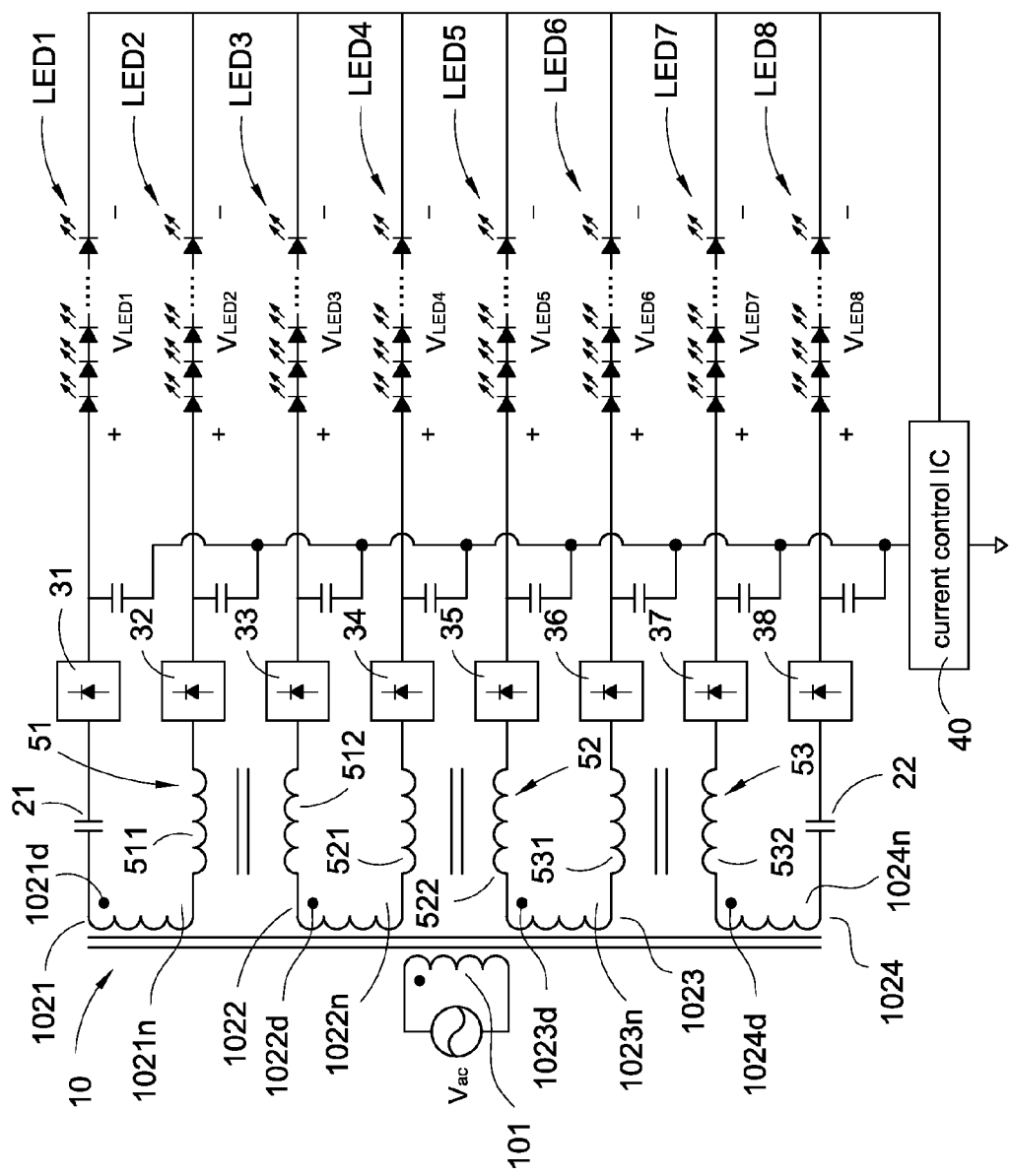
FIG. 6 is a schematic circuit block diagram of the power drive system of light-emitting diode strings according to a fifth embodiment of the present disclosure.

Reference is made to FIG. 6 which is a schematic circuit block diagram of the power drive system of light-emitting diode strings according to a fifth embodiment of the present disclosure. The major difference between the fifth embodiment and the second embodiment is that the number of LED strings is eight. Because the number of LED strings is eight, the number of secondary-side windings is four, the number of rectifying units is eight, the number of current-sharing capacitors is two, and the number of common chokes is three. Each rectifying unit is correspondingly connected to a LED string, and each secondary-side winding is correspondingly connected to two rectifying units and two LED strings. Especially, the first current-sharing capacitor 21 and the second current-sharing capacitor 22 are correspondingly connected to the two opposite outermost terminals of the secondary-side windings, namely the outermost dotted terminal and the outermost non-dotted terminal. In this embodiment, the first current-sharing capacitor 21 is connected to the first dotted terminal 1021*d* of the first secondary-side winding 1021; the second current-sharing capacitor 22 is connected to the fourth non-dotted terminal 1024*n* of the fourth secondary-side winding 1024. In addition, a first common choke 51 is connected between the first secondary-side winding 1021 and the second secondary-side winding 1022; a second common choke 52 is connected between the second secondary-side winding 1022 and the third secondary-side winding 1023; a third common choke 53 is connected between the third secondary-side winding 1023 and the fourth secondary-side winding 1024. More specifically, the first common choke 51 is connected to the first non-dotted terminal 1021*n* of the first secondary-side winding 1021 and the second dotted terminal 1022*d* of the second secondary-side winding 1022; the second common choke 52 is connected to the second non-dotted terminal 1022*n* of the second secondary-side winding 1022 and the third dotted terminal 1023*d* of the third secondary-side winding 1023; the third common choke 53 is connected to the third non-dotted terminal 1023*n* of the third secondary-side winding 1023 and the fourth dotted terminal 1024*d* of the fourth secondary-side winding 1024. Comparing to the connection between the first current-sharing capacitor 21, the second current-sharing capacitor 22, and the secondary-side windings, the first common choke 51 is connected to inner non-dotted terminal of the first secondary-side winding 1021 and inner dotted terminal of the second secondary-side winding 1022; the second common choke 52 is connected to inner non-dotted terminal of the second secondary-side winding 1022 and inner dotted terminal of the third secondary-side winding 1023; and the third common choke 53 is connected to inner non-dotted terminal of the third secondary-side winding 1023 and inner dotted terminal of the fourth secondary-side winding 1024.

According to descriptions of the above-mentioned embodiments, the power drive system of LED strings has features as follows:

1. When the number of LED strings is two, the number of secondary-side windings is one and the number of rectifying units is two, and the number of current-sharing capacitors is one and the common choke is absent (as shown in FIG. 2);

2. When the number of LED strings is more than two and even, the number of current-sharing capacitors is two, the number of rectifying units is equal to that of LED strings, the number of secondary-side windings is half of that of LED strings, and the number of common chokes is one less than that of secondary-side windings (as shown in FIG. 3, FIG. 5, and FIG. 6); and 3. When the number of LED strings is more than two and odd, the number of current-sharing capacitor is two, the number of rectifying units is one more than that of LED strings, the number of secondary-side windings is half of that of rectifying units, and the number of common chokes is one less than that of secondary-side windings (as shown in FIG. 4).

In conclusion, the present disclosure has following advantages:

1. Only one current control IC 40 is provided to control total current flowing through the LED strings, thus simplifying circuit designs and significantly reducing circuit costs;

2. The design of the drive voltage is focused on the rectifying units, current-sharing capacitors, and the common chokes, thus reducing energy losses during energy conversion of the current control IC 40 and increasing conversion efficiency;

3. The passive components, such as current-sharing capacitors and common chokes are used to implement the current-sharing function; in addition, the turn ratio of the common choke can be adjusted to obtain different current ratios between two LED strings;

4. The circuit connection can be adjusted to provide power for driving for applying even LED strings and odd LED strings. That is, each secondary-side winding is connected to two LED strings when the number of LED strings is even, and one secondary-side winding is connected to one LED string and each of the remaining secondary-side windings is connected to two LED strings when the number of LED strings is odd; and 5. The fixed conversion voltage $V_{LLC}$ and the adjustable boost voltage Vbst are implemented to provide adaptive voltage control for implementing uniform illumination of the LED strings, and also to meet wide drive voltage under different current conditions for the LED strings.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power drive system of light-emitting diode (LED) strings for driving a plurality of LED strings, the power drive system comprising:
    an isolation transformer having a primary-side winding and a secondary-side winding, the primary-side winding receiving an AC power source, and the secondary-side winding having a dotted terminal and a non-dotted terminal;
    a current-sharing capacitor, one terminal of the current-sharing capacitor connected to the dotted terminal of the secondary-side winding;
    two rectifying units, one rectifying unit connected to the other terminal of the current-sharing capacitor and the other rectifying unit connected to the non-dotted terminal of the secondary-side winding; each rectifying unit correspondingly connected to a LED string; and
    a current control integrated circuit (IC), connected between common points of the rectifying units and corresponding anode terminals of the LED strings and corresponding cathode terminals of the LED strings, and configured to simultaneously drive the LED strings and control total current flowing through the LED strings.

2. The power drive system in claim 1, wherein the LED string connected to the dotted terminal of the secondary-side winding is driven when the AC power source is operated in a positive half cycle; the LED string connected to the non-dotted terminal of the secondary-side winding is driven when the AC power source is operated in a negative half cycle.

3. The power drive system in claim 1, wherein the current-sharing capacitor and the rectifying units are configured to generate a conversion voltage with a constant voltage value; the current control IC is configured to generate a boost voltage with an adjustable voltage value.

4. A power drive system of light-emitting diode (LED) strings for driving a plurality of LED strings, the power drive system comprising:
    an isolation transformer having a primary-side winding and at least two secondary-side windings, the primary-side winding receiving an AC power source, and each secondary-side winding having a dotted terminal and a non-dotted terminal;
    two current-sharing capacitors including a first current-sharing capacitor and a second current-sharing capacitor; one terminal of the first current-sharing capacitor connected to the dotted terminal of one secondary-side winding, and one terminal of the second current-sharing capacitor connected to the non-dotted terminal of another secondary-side winding;
    at least one common choke, each common choke connected between one dotted terminal and one non-dotted terminal of two secondary-side windings;
    at least four rectifying units, two rectifying units correspondingly connected to the other terminal of the first current-sharing capacitor and the other terminal of the second current-sharing capacitor, and other rectifying units correspondingly connected to the at least one common choke; each rectifying unit correspondingly connected to a LED string; and
    a current control integrated circuit (IC), connected between common points of the rectifying units and corresponding anode terminals of the LED strings and corresponding cathode terminals of the LED strings, and configured to simultaneously drive the LED strings and control total current flowing through the LED strings.

5. The power drive system in claim 4, wherein the LED string connected to the dotted terminal of the secondary-side winding is driven when the AC power source is operated in a positive half cycle; the LED string connected to the non-dotted terminal of the secondary-side winding is driven when the AC power source is operated in a negative half cycle.

6. The power drive system in claim 4, wherein the current-sharing capacitor and the rectifying units are configured to generate a conversion voltage with a constant voltage value; the current control IC is configured to generate a boost voltage with an adjustable voltage value.

7. The power drive system in claim 4, wherein when the number of LED strings is more than two and even, the number of current-sharing capacitors is two, the number of rectifying units is equal to that of LED strings, the number of secondary-side windings is half of that of LED strings, and the number of common chokes is one less than that of secondary-side windings.

8. The power drive system in claim 4, wherein when the number of LED strings is more than two and odd, the number of current-sharing capacitor is two, the number of rectifying units is one more than that of LED strings, the number of secondary-side windings is half of that of rectifying units, and the number of common chokes is one less than that of secondary-side windings.

9. The power drive system in claim 8, wherein when the number of LED strings is more than two and odd, one secondary-side winding is connected to one LED string and each of the remaining secondary-side windings is connected to two LED strings.

* * * * *